June 19, 1962 A. H. PRATT, JR., ETAL 3,039,148
ORNAMENTAL ARTIFICIAL PRODUCT
Filed Feb. 16, 1960 2 Sheets-Sheet 1

INVENTORS
ROBERT EDWARD LIBBY
ADDISON HASKELL PRATT, JR.
BY
*William Frederick Werner*
ATTORNEY June 19, 1962   A. H. PRATT, JR., ETAL   3,039,148
ORNAMENTAL ARTIFICIAL PRODUCT
Filed Feb. 16, 1960   2 Sheets-Sheet 2

INVENTORS
ROBERT EDWARD LIBBY
ADDISON HASKELL PRATT, JR.
BY
William Frederick Werner
ATTORNEY

3,039,148
ORNAMENTAL ARTIFICIAL PRODUCT
Addison Haskell Pratt, Jr., 150 Booth Hill Road, North Scituate, Mass., and Robert Edward Libby, 77—35 113th St., Forest Hills, N.Y.
Filed Feb. 16, 1960, Ser. No. 8,958
2 Claims. (Cl. 18—59)

This invention relates to ornamental artificial products and more particularly to articles formed of pieces of stained glass artistically embedded in plastic material such as transparent thermoplastic derivatives of cellulose.

An object of the present invention is the economic production of a strong and durable article of artistic and scintillating appearance and one which shall retain its aesthetic appearance indefinitely.

Another object of the present invention is to produce a cast product consisting of pieces of stained glass manually positioned to produce an ornamental pattern; the stained glass is then cast in transparent plastic material resulting in a three dimensional effect. The interstices of pieces of stained glass, forming the pattern, permitting the plastic material to flow or fuse therethrough to form a homogeneous mass.

The present invention permits use of pattern pieces of any color, thickness, or shape, as well as the composition of varied colored stained glass.

Another object of the present invention is to superimpose two or more layers of stained glass, having different colors and shapes, one upon the other and then cast the two layers into a transparent or translucent homogeneous mass consisting of a thermoplastic derivative of cellulose.

And still another object of the present invention is to provide a casting of transparent or translucent material of thermoplastic derivative of cellulose having embedded therein a plurality of layers of different colors and shapes of glass material to form an ornamental artificial product of varied colored patterns and shapes and in which the edges of the glass material reflect light rays.

Other objects of the present invention will become apparent in part and be pointed out in part in the following specification and claims.

Referring to the drawings, in which similar reference characters refer to similar parts in all the views.

Figure 2:
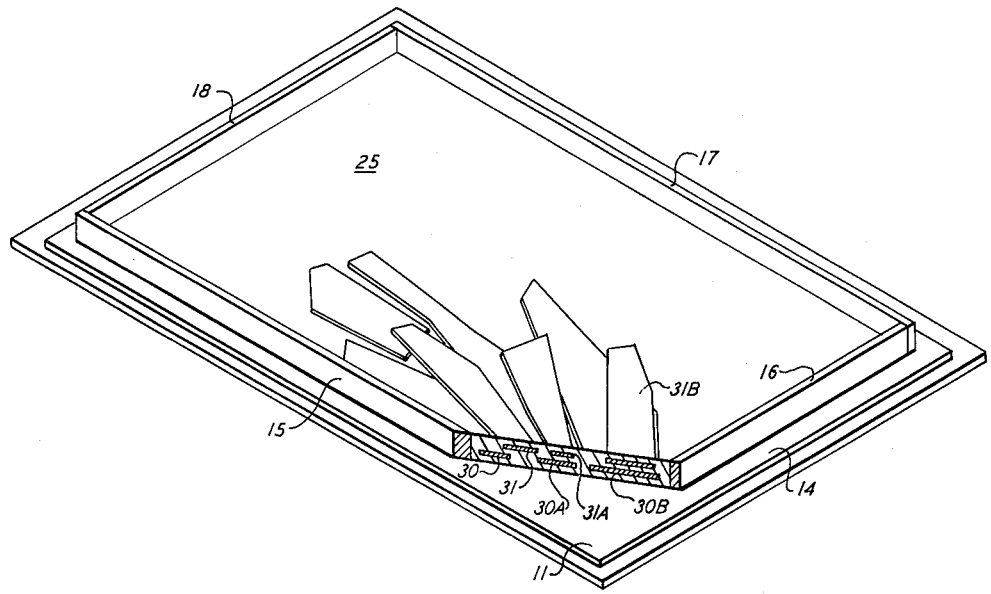
FIGURE 2 is a perspective view, partly in section, illustrating one of the steps in the manufacture of the new and improved ornamental artificial product.
Figure 1:
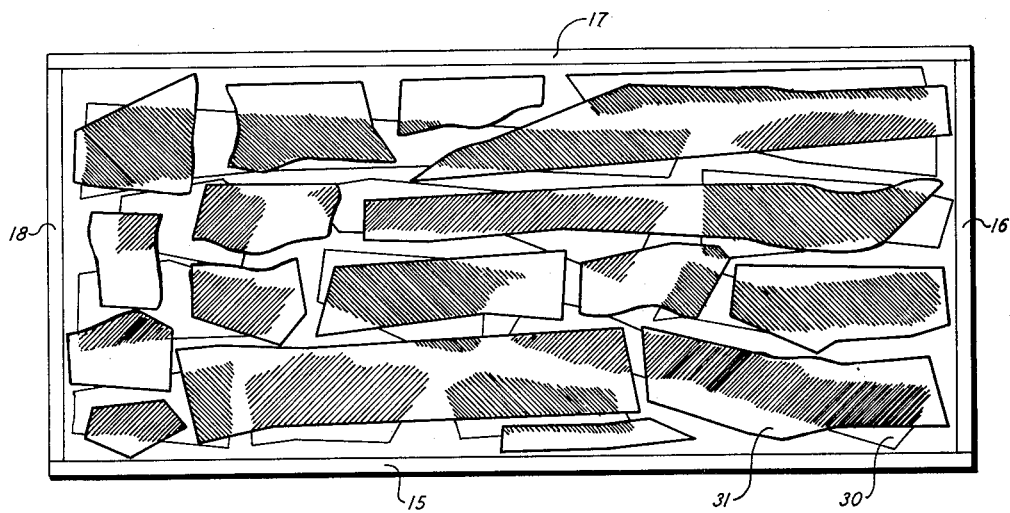
FIGURE 1 is a plan view of the new and improved ornamental artificial product.
Figure 3:
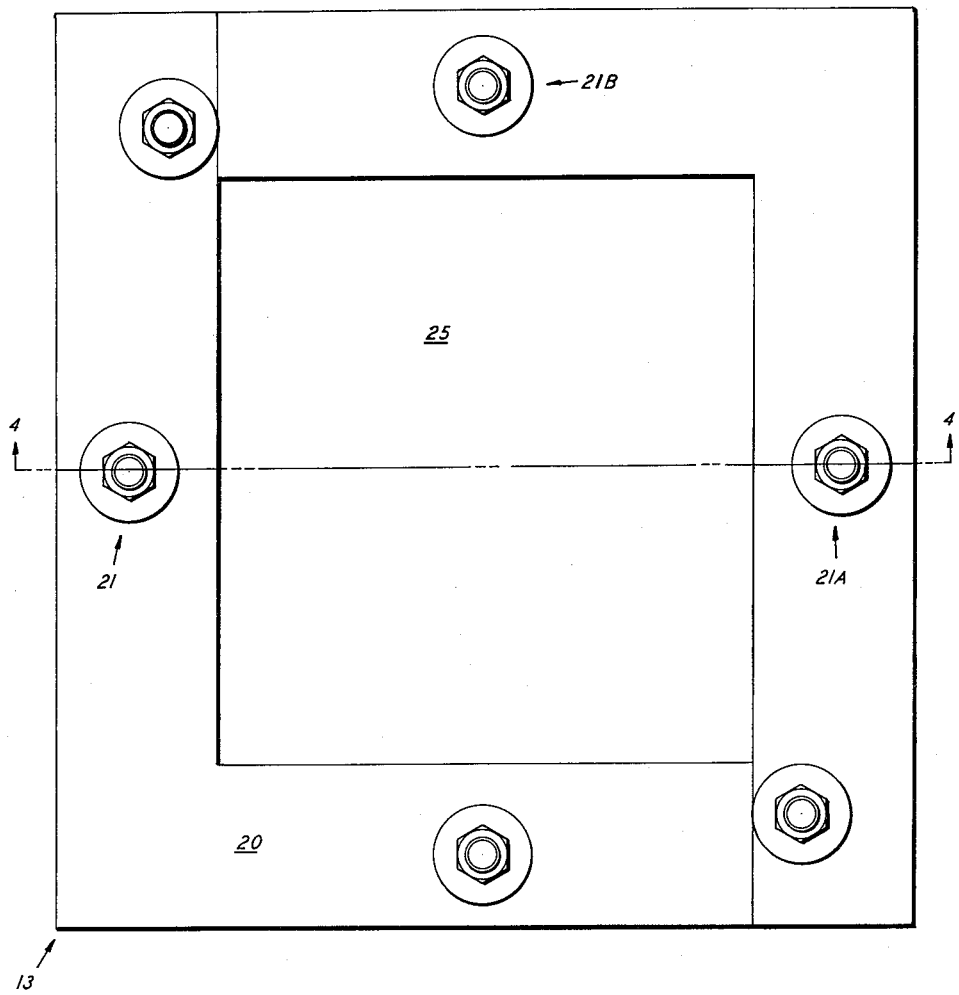
FIGURE 3 is a plan view of a fixture used in the making of the new and improved ornamental artificial product.
Figure 4:
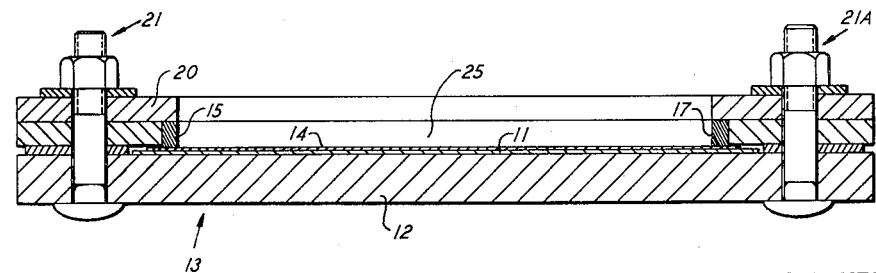
FIGURE 4 is a transverse cross sectional view taken along line 4—4 of FIGURE 3.

In proceeding with this invention special reference is made to FIGURES 2 and 4 wherein is illustrated an aluminum or stainless steel plate 11 which is placed on the base 12 of a frame, generally indicated by reference character 13. A thin film of petroleum jelly is spread upon the top surface of plate 11. A sheet of cellophane 14 is layed upon the film of petroleum jelly and squeezed into contact with plate 11. The squeezing removing air bubbles and lumps of petroleum jelly interposed between the sheet of cellophane and the steel plate.

The four sides 15, 16, 17 and 18 of a picture frame are then placed in position in a pressure frame 13. The cover 20 is then secured in place by means of nut and bolt combinations generally indicated by reference characters 21, 21A, 21B, etc., binding the four sides 15, 16, 17 and 18 of the picture frame between cover 20 and cellophane sheet 14 through base 12 and plate 11.

The four sides 15, 16, 17 and 18 of the picture frame may be attached to each other in a pre-formed frame or preferably the sides are placed in pressure frame 13 as individual, unattached strips of wood, plastic, metal or other picture framing material.

A very thin liquid layer of a thermoplastic derivative of cellulose, transparent or translucent is poured into the cavity 25 lying within the confines of the picture frame sides 15, 16, 17 and 18. Varied colored pieces of stained glass 30, 30A, etc., of any and varied shapes are layed upon the thin layer of thermoplastic derivative of cellulose after the liquid has solidified. The pieces of stained glass are placed in position to form a pattern.

A second very thin liquid layer of a thermoplastic derivative of cellulose is poured into cavity 25 to a depth which places a very thin film of liquid cellulose over the top of the first layer of colored stained glass, 30, 30A, 30B, etc. The thermoplastic derivative of cellulose possesses characteristics such that the first layer will blend into the second layer in a homogeneous mass without impairing the transparent qualities of the mass.

A second layer of varied colored pieces of stained glass 31, 31A, 31B of any and varied shapes are layed upon and across the first layer of pieces of stained glass 30, 30A, 30B, before the second layer of liquid cellulose solidifies. This allows the weight of the pieces of stained glass in the first layer of pieces of stained glass to partially displace the liquid cellulose for purposes which will presently appear.

A third liquid layer of a thermoplastic derivative of cellulose is poured into cavity 25 to a desired depth, preferably to fill cavity 25 to the depth of sides 15, 16, 17 and 18.

If desired the third layer of liquid cellulose can be poured into cavity 25 to a depth sufficient to cover the second layer of stained glass pieces 31, 31A, 31B, etc. In this manner three or more layers of colored stained glass may be arranged in cavity 25 and be solidified into position upon the solidifying of the liquid cellulose.

Upon the solidifying of the liquid cellulose the frame containing the solid mass of hardened cellulose and layers of colored stained glass superimposed one upon the other is removed from pressure frame 13; thereby producing an ornamental artificial product of artistic design having aesthetic qualities of rich tones of color in varied colored patterns. The patterns are enhanced, artistically, through the light reflecting off the edges of the colored glass.

The sheet of cellophane is stripped from the first layer of solidified cellulose, thereby producing a plate glass smooth surface. The top surface of the last layer of solidified cellulose will be uneven. This can remain so for light reflection purposes or the surface may be made smooth by the application of a polishing wheel.

Frame 13 and sides 15, 16, 17 and 18 may be replaced by an aluminum or stainless steel mold having sides which will produce a cavity 25. The steps recited for forming the ornamental artificial product supra, may be followed. The product will be the same except the finished product will not have a picture frame. In that event the edges may be smoothed and painted to produce a finished product of artistic design.

Having shown and described preferred embodiments of the present invention, by way of example, it should be realized that structural changes could be made and other examples given without departing from either the spirit or scope of this invention.

What we claim is:
1. Method of forming an ornamental artificial product which comprises, placing on a smooth flat plate a thin film of a petroleum product, superimposing a sheet of plastic material, removing air bubbles between said sheet of plastic material and said flat plate, confining said smooth flat plate and sheet of plastic material to a desired shaped enclosure, pouring a thin liquid layer of a transparent thermoplastic derivative of cellulose over said sheet of plastic material, placing a plurality of pieces of varied colored stained glass having varied geometric shapes upon said thermoplastic derivatives of cellulose in an artistic design, pouring a second thin liquid layer of a transparent thermoplastic derivative of cellulose over said layer and said pieces, placing a plurality of pieces of varied colored stained glass having varied geometric shapes upon said second thin layer of transparent thermoplastic derivative of cellulose in a manner to produce an artistic pattern in combination with said first layer of plurality of pieces of varied colored stained glass and then pouring a third liquid layer of transparent thermoplastic derivative of cellulose over said second thermoplastic derivative layer and second layer of glass to complete the desired shape, allowing said layers of transparent thermoplastic derivative of cellulose to solidify into a homogeneous mass, removing said solidified homogeneous mass from said enclosure and removing said sheet of plastic material from said homogeneous mass to provide a smooth surface on said homogeneous mass.

2. Method of forming an ornamental artificial product which comprises the steps of providing a smooth flat plate, superimposing a sheet of plastic material, placing said smooth flat plate and sheet of plastic material in a pressure frame to force and hold said four picture frame pieces of material in said pressure frame, tightening said pressure frame to force and hold said four picture frame pieces against said sheet of plastic material to form a desired shaped enclosure, pouring a thin liquid layer of transparent thermoplastic derivative of cellulose over said sheet of plastic material, placing a layer consisting of a plurality of pieces of colored vitreous material upon said thin layer of transparent thermoplastic derivative of cellulose, pouring a second thin liquid layer of transparent thermoplastic derivative of cellulose into said enclosure to a depth to form a thin covering over said plurality of pieces of colored vitreous material, placing a second layer consisting of a plurality of pieces of colored vitreous material upon said second layer of transparent thermoplastic derivative of cellulose in a manner to produce an artistic pattern in combination with said first mentioned layer consisting of pieces of colored vitreous material, and then pouring a third liquid layer of transparent thermplastic derivative of cellulose over said second thermoplastic derivative layer and second layer of glass to complete the desired shape, allowing said three layers of liquid transparent thermoplastic derivative of cellulose to solidify into a homogeneous mass, removing said homogeneous mass and mold of four picture frame pieces of material from said pressure frame, removing said sheet of plastic material from said homogeneous mass to provide a smooth surface and a scintillating effect within said four picture frame pieces of material.

References Cited in the file of this patent

UNITED STATES PATENTS

| 2,668,328 | Porter | Feb. 9, 1954 |
| 2,712,190 | Sobel | July 5, 1955 |
| 2,871,152 | Tobin | Jan. 27, 1959 |

FOREIGN PATENTS

| 8,557,669 | Belgium | Nov. 20, 1957 |